United States Patent
Muntes et al.

(10) Patent No.: US 9,329,837 B2
(45) Date of Patent: May 3, 2016

(54) GENERATING A PROPOSAL FOR SELECTION OF SERVICES FROM CLOUD SERVICE PROVIDERS BASED ON AN APPLICATION ARCHITECTURE DESCRIPTION AND PRIORITY PARAMETERS

(71) Applicant: CA, INC., Islandia, NY (US)

(72) Inventors: Victor Muntes, Barcelona (ES); Peter Brian Matthews, Hertfordshire (GB); Jacek Dominiak, Barcelona (ES)

(73) Assignee: CA, Inc., New York, NY (US)

( * ) Notice: Subject to any disclaimer, the term of this patent is extended or adjusted under 35 U.S.C. 154(b) by 85 days.

(21) Appl. No.: 14/222,159

(22) Filed: Mar. 21, 2014

(65) Prior Publication Data

US 2015/0268935 A1 Sep. 24, 2015

(51) Int. Cl.
*G06F 9/44* (2006.01)
*G06Q 10/06* (2012.01)
*G06F 3/0484* (2013.01)

(52) U.S. Cl.
CPC .. *G06F 8/20* (2013.01); *G06F 8/70* (2013.01); *G06Q 10/06313* (2013.01); *G06F 3/0484* (2013.01); *G06F 8/10* (2013.01); *G06F 8/34* (2013.01); *G06F 8/38* (2013.01)

(58) Field of Classification Search
CPC ............... G06F 8/20; G06F 8/10; G06F 8/34; G06F 8/38; G06F 3/0484
See application file for complete search history.

(56) References Cited

U.S. PATENT DOCUMENTS

| | | | |
|---|---|---|---|
| 7,159,206 B1 * | 1/2007 | Sadhu | G06Q 10/06 717/101 |
| 9,075,501 B1 * | 7/2015 | Woodage | G06F 3/0481 |
| 2014/0047406 A1 * | 2/2014 | Lam | G06F 8/20 717/104 |
| 2014/0280058 A1 * | 9/2014 | St. Clair | G06F 17/30867 707/722 |
| 2014/0280966 A1 * | 9/2014 | Sapuram | G06Q 30/631 709/226 |
| 2015/0324731 A1 * | 11/2015 | Balasubramanian | G06Q 10/06 717/102 |

OTHER PUBLICATIONS

Meriem Ouederni et al., Measuring the Compatibility of Service Interaction Protocols, ACM 2011, retrieved online on Dec. 2, 2015, pp. 1560-1567. Retrieved from the Internet: <URL: http://delivery.acm.org/10.1145/1990000/1982516/p1560-ouederni.pdf?>.*

Alexey Cherchago, Service Specification and Matching based on Graph Transformation, 2006, retrieved online on Dec. 2, 2015, pp. 1-147. Retrieved from the Internet: <URL: http://is.uni-paderborn.de/uploads/tx_sibibtex/Service_Specification_and_Matching_based_on_Graph_Transformation.pdf>.*

(Continued)

*Primary Examiner* — Thuy Dao
*Assistant Examiner* — Hanh T Bui
(74) *Attorney, Agent, or Firm* — Myers Bigel & Sibley, P.A.

(57) ABSTRACT

A method includes performing operations as follows on a processor: receiving an architecture description for a software application that identifies a plurality of generic services, receiving a requirement description for the software application that comprises respective values for a plurality of priority parameters for the software application, and generating a proposal that, for each of the plurality of generic services, identifies a specific cloud service for the respective generic service based on the requirement description.

24 Claims, 6 Drawing Sheets

(56) References Cited

OTHER PUBLICATIONS

Gord Lumban Gaol, Homology graph mining for social network analysis, IEEE, 2011, retrieved online on Dec. 2, 2015, pp. 269-272. Retrieved from the Internet: <URL: http://ieeexplore.ieee.org/stamp/stamp.jsp?tp=&arnumber=6137803>.*

Seventh Framework Programme, MODAClouds, MOdel-Driven Approach for design and execution of applications on multiple Clouds, THEME [ICT-2011.1.2], Cloud Computing, Internet of Services and Advanced Software Engineering, Grant Agreement for Collaborative project, Grant agreement No: 318484, Starting Date: Jan. 10, 2012, 179 Pages.

* cited by examiner

GENERATING A PROPOSAL FOR SELECTION OF SERVICES FROM CLOUD SERVICE PROVIDERS BASED ON AN APPLICATION ARCHITECTURE DESCRIPTION AND PRIORITY PARAMETERS

BACKGROUND

The present disclosure relates to computing systems, and, in particular, to application deployment in a cloud computing environment.

Software developers may use a variety of different services in developing a new software application. These services may come from different sources including cloud service providers. In some instances, a software developer may obtain all of the cloud services needed for a software application from a single cloud service provider. In other situations, however, a software developer may not be able to rely on a single cloud service provider to source all of the required cloud services for a particular application. Various tools exist that software developers may use to evaluate a service from a single cloud service provider. These tools may not be effective, however, when building an application with services from multiple cloud service providers.

SUMMARY

In some embodiments of the inventive subject matter, a method comprises performing operations as follows on a processor: receiving an architecture description for a software application that identifies a plurality of generic services, receiving a requirement description for the software application that comprises respective values for a plurality of priority parameters for the software application, and generating a proposal that, for each of the plurality of generic services, identifies a specific cloud service for the respective generic service based on the requirement description.

In other embodiments, the plurality of priority parameters comprises an accountability parameter, an agility parameter, an assurance parameter, a financial performance parameter, a security parameter, a privacy parameter, and a usability parameter.

In still other embodiments, the method further comprises generating an interoperability graph that comprises vertices representing candidate services for the plurality of generic services. Generating the proposal comprises generating the proposal based on the interoperability graph.

In still other embodiments, the interoperability graph comprises a plurality of the vertices representing a plurality of the candidate services for one of the plurality of generic services.

In still other embodiments, generating the interoperability graph comprises identifying compatibility information between the vertices of the interoperability graph by connecting at least a portion of the vertices with edges, respectively.

In still other embodiments, identifying the compatibility information comprises identifying structural compatibility information between the vertices of the interoperability graph by connecting at least the portion of the vertices with structural compatibility edges, respectively. Generating the proposal comprises querying the interoperability graph to obtain structural compatibility information for the candidate services.

In still other embodiments, identifying the compatibility information comprises identifying conditional compatibility information between the vertices of the interoperability graph by connecting at least the portion of the vertices with conditional compatibility edges, respectively. Generating the proposal comprises querying the interoperability graph to obtain conditional compatibility information for the candidate services.

In still other embodiments, identifying the compatibility information comprises identifying migration compatibility information between the vertices of the interoperability graph by connecting at least the portion of the vertices with migration compatibility edges, respectively. Generating the proposal comprises querying the interoperability graph to obtain structural migration information for the candidate services.

In still other embodiments, generating the proposal that identifies the specific cloud services comprises generating a plurality of combinations of specific cloud services from the candidate services. The method further comprises receiving a selection of one of the plurality of combinations of specific cloud services by a user and providing risk and cost information to the user that is associated with the one of the plurality of combinations of specific cloud services that was selected by the user.

In still other embodiments, generating the proposal that identifies the specific cloud services, comprises receiving a selection of one of the specific cloud services from a user and generating a plurality of combinations of specific cloud services from the candidate services such as that each of the plurality of combinations of specific cloud services includes the one of the specific cloud services that was selected by the user. The method further comprises receiving a selection of one of the plurality of combinations of specific cloud services by a user and providing risk and cost information to the user that is associated with the one of the plurality of combinations of specific cloud services that was selected by the user.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

Some embodiments of the inventive subject matter stem from a realization that a consumer of cloud services may need to add additional services or create new applications that use new/different services. For example, one application may be constructed with services sourced from different cloud service providers. An application may be constructed using services from a first cloud service provider and replicated such that the replicated application is constructed using services from a second cloud service provider. These new and/or additional services may come from one or more new service providers either by necessity or because of a desire by the consumer to diversify the suppliers that it uses for software/computing services. A consumer may have difficulty in selecting new services, however, as many considerations may need to be evaluated, such as, but not limited to, cost, risk, quality of service (QoS), compatibility between providers, provider agnosticism with respect to the application, etc. According to some embodiments of the inventive subject matter, a MultiCloud decision support system (DSS) receives an architecture description for a software application that identifies multiple generic services. The MultiCloud DSS also receives a requirement description that comprises values for multiple priority parameters, respectively. These priority parameters may be selected from characteristics that comprise the Service Management Index (SMI) and may include, but are not limited to, an accountability parameter, an agility parameter, an assurance parameter, a financial performance parameter, a security parameter, a privacy parameter, and a usability parameter. The MultiCloud DSS may generate a proposal that identifies a specific cloud service for each of the generic services based on the requirement description. In some embodiments of the inventive subject matter, the MultiCloud DSS may generate an interoperability graph that is used to generate the proposal for the specific cloud service(s) and cloud service providers. The incompability graph may comprise vertices that represent candidate services and candidate service providers for the multiple generic services with edges between the vertices identifying compatibility relationships between the candidate services. The compatibility relationships may be expressed in terms of structural compatibility information, conditional compatibility information, and migration compatibility information according to some embodiments of the inventive subject matter.

Figure 1:
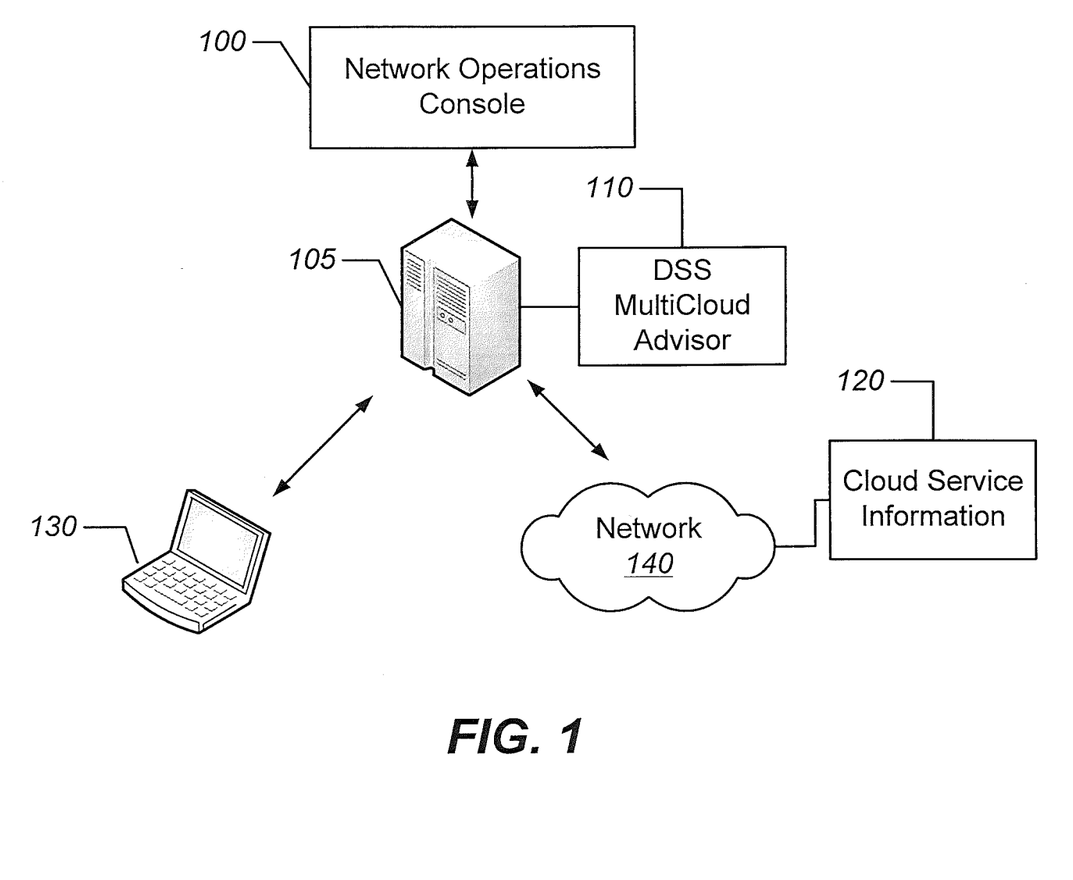
FIG. 1 is a block diagram of a system for generating a proposal for selection of specific services from cloud service providers in accordance with some embodiments of the inventive subject matter.
Figure 7:
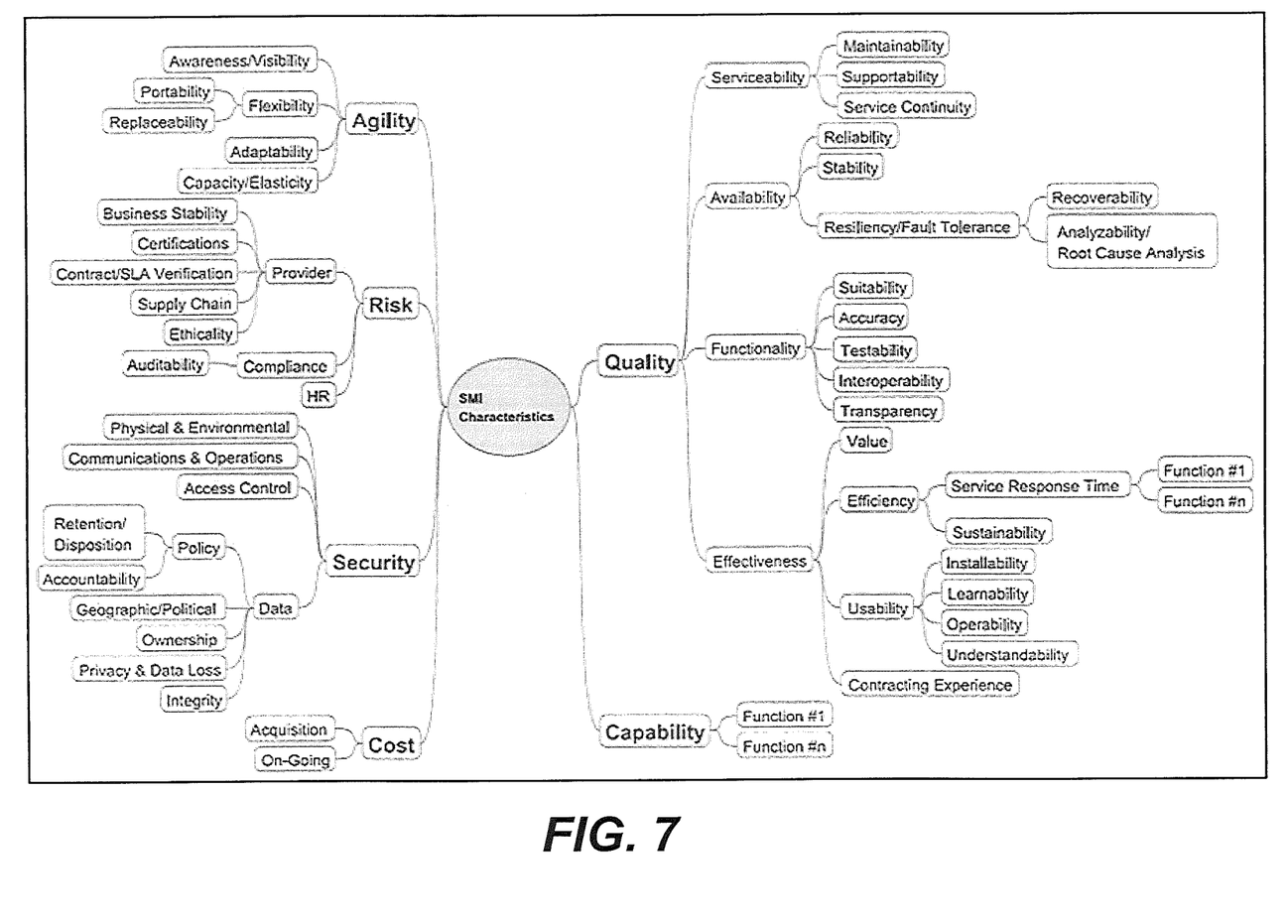
FIG. 7 is a diagram that illustrates example categories and sub-categories of metrics or characteristics that can be used to evaluate cloud services using the Service Management Index (SMI).

FIG. 1 is a block diagram of a system for generating a proposal for selection of specific services from one or more cloud service providers according to some embodiments of the inventive subject matter. A MultiCloud DSS server 105 is connected to a network operations console 100 through which software developers, administrators, or other types of personnel involved in managing and maintaining software applications may access the MultiCloud DSS server 105 to obtain proposals for selection of specific service(s) from one or more cloud service providers. The users of the MultiCloud DSS server 105 may facilitate the input of an architecture description to the MultiCloud DSS server 105 that identifies one or more generic cloud services that may be used in or to support a software application. The user of the MultiCloud DS server 105 may also facilitate the input of a requirement description to the MultiCloud DSS server 105 that comprises values for one or more priority parameters for the software application. In accordance with some embodiments of the inventive subject matter, the parameters may be selected from characteristics that comprise the Service Management Index (SMI). The SMI defines a framework and method for the calculation of a relative index, which may be used to compare IT services against one another or to track the quality of IT services over time. The SMI allows consumers of cloud services to rate them, via standardized surveys, across key metrics, such as quality, agility, risk, cost, capability, and security. FIG. 7 illustrates example categories and sub-categories of metrics or characteristics that can be used to evaluate cloud services using the SMI. According to some embodiments of the inventive subject matter, the priority parameters for the software application may include, but are not limited to, an accountability parameter, an agility parameter, an assurance parameter, a financial performance parameter, a security parameter, a privacy parameter, and a usability parameter. The MultiCloud DSS server 105 includes a DSS MultiCloud advisor module 110 and may access various Websites, databases, and other types of information stores represented in FIG. 1 as cloud service information 120 via the network 140 to obtain information regarding various specific cloud services and cloud service providers that may be candidates for providing the generic service(s) for the software application. The DSS MultiCloud advisor module 110 uses the cloud service information 120 along with the architecture description and requirement description to generate a proposal that identifies a specific cloud service and cloud service provider for each of the generic services.

As shown in FIG. 1, users may also access the MultiCloud DSS server 105 remotely through mobile or portable devices 130 in addition to access through the network operations console 100. The connections between the MultiCloud DSS server 105 and the network operations console 100 and device(s) 130 may include wireless and/or wireline connections and may be direct or include one or more intervening local area networks, wide area networks, and/or the Internet. The network 140 may be a global network, such as the Internet or other publicly accessible network. Various elements of the network 140 may be interconnected by a wide area network, a local area network, an Intranet, and/or other private network, which may not be accessible by the general public. Thus, the communication network 140 may represent a combination of public and private networks or a virtual private network (VPN). The network 140 may be a wireless network, a wireline network, or may be a combination of both wireless and wireline networks.

Although FIG. 1 illustrates a system for generating a proposal for selection of specific services from one or more cloud service providers according to some embodiments of the inventive subject matter it will be understood that embodiments of the present invention are not limited to such configurations, but are intended to encompass any configuration capable of carrying out the operations described herein.

Figure 2:
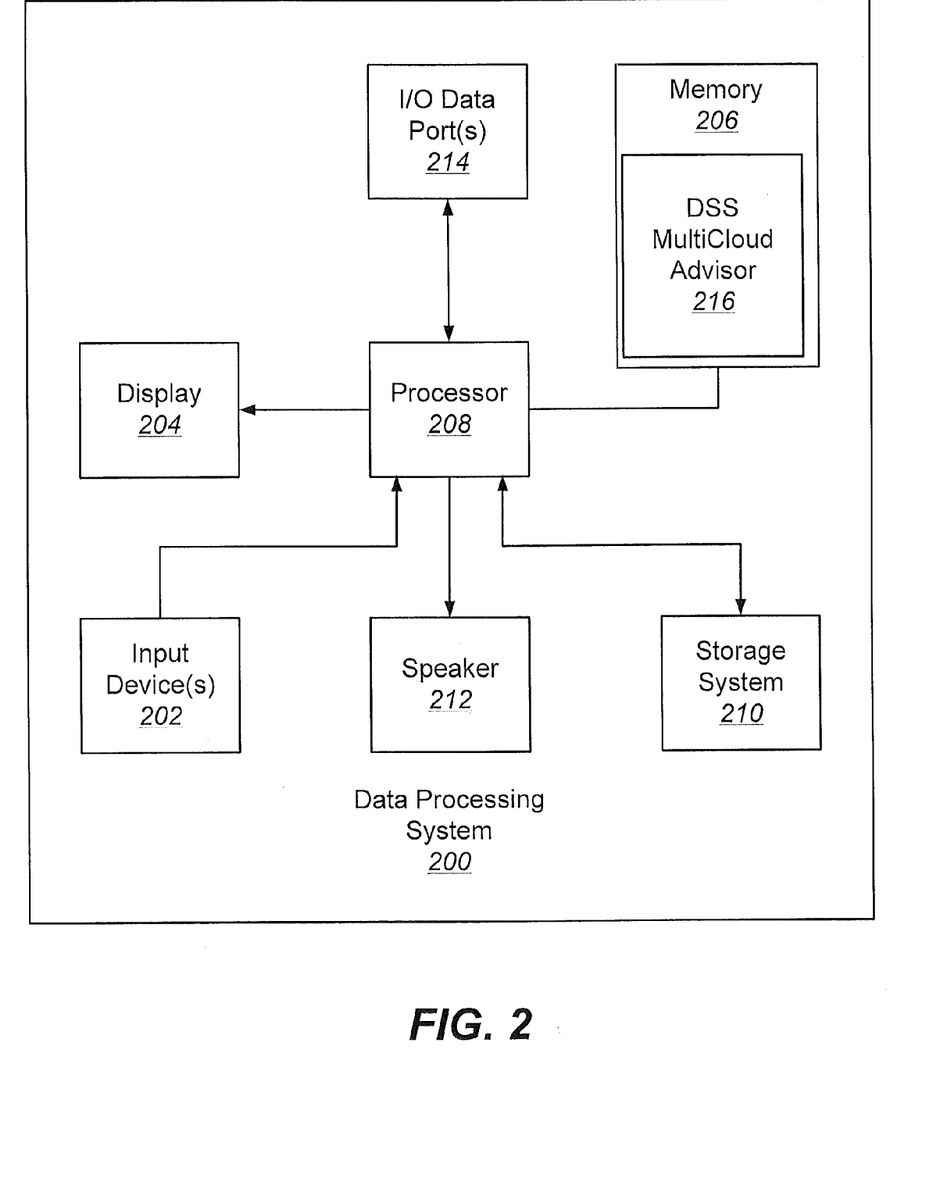
FIG. 2 illustrates a data processing system that may be used to implement the MultiCloud advisor system of FIG. 1 in accordance with some embodiments of the inventive subject matter.

Referring now to FIG. 2, a data processing system 200 that may be used to implement the MultiCloud DSS server 105 of FIG. 1, in accordance with some embodiments of the inventive subject matter, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a DSS MultiCloud Advisor module 216 that may be configured to generate a proposal for selection of specific services from one or more cloud service providers according to some embodiments of the inventive subject matter.

Figure 3:
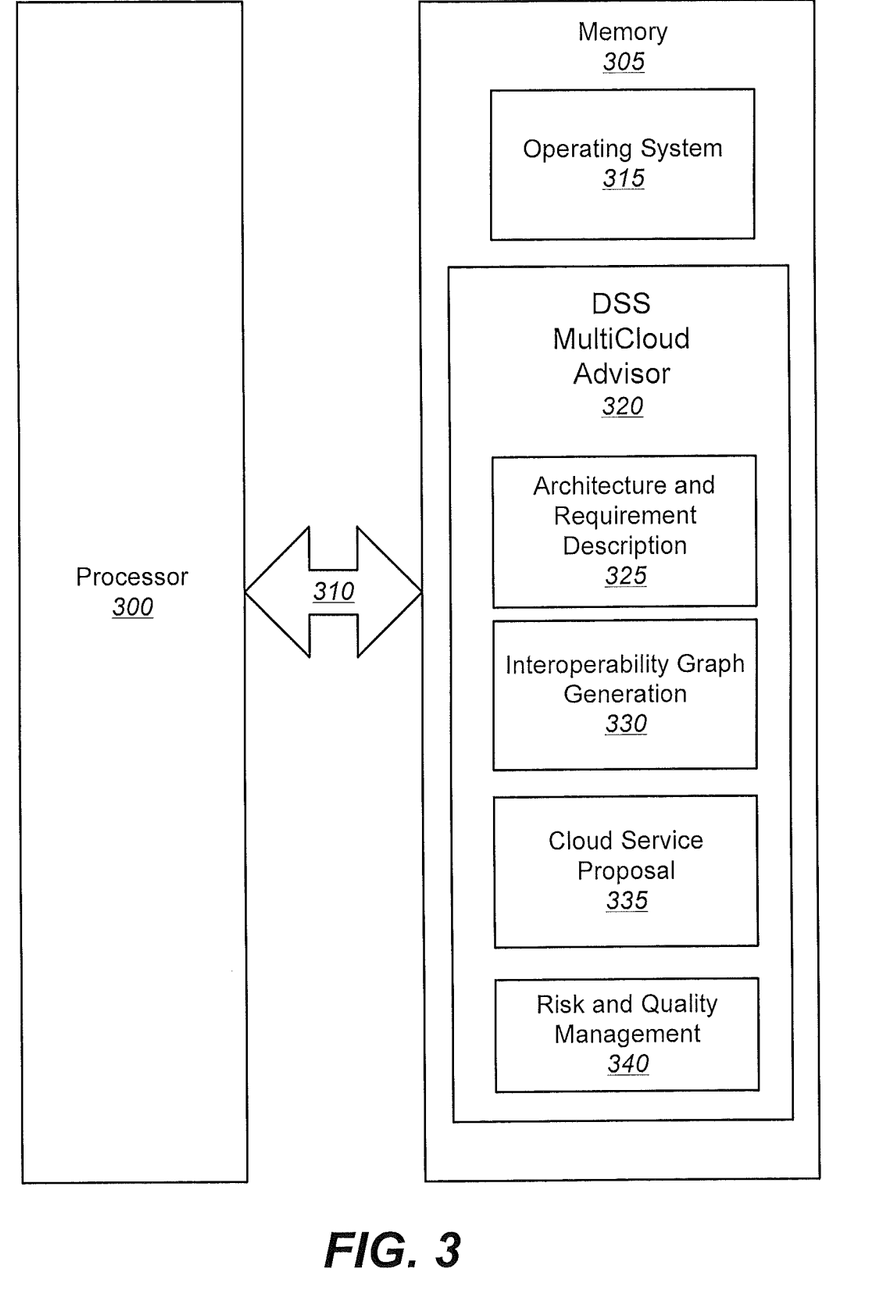
FIG. 3 is a block diagram that illustrates a software/hardware architecture for selection of specific services from cloud service providers in accordance with some embodiments of the present inventive subject matter.

FIG. 3 illustrates a processor 300 and memory 305 that may be used in embodiments of data processing systems, such as the MultiCloud DSS server 105 of FIG. 1 and the data processing system 200 of FIG. 2, respectively, for generating a proposal for selection of specific services from one or more cloud service providers, according to some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for generating a proposal for selection of specific services from one or more cloud service providers in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a DSS MultiCloud advisor module 320. The operating system 315 generally controls the operation of the data processing system. In particular, the operating system 315 may manage the data processing system's software and/or hardware resources and may coordinate execution of programs by the processor 300. The architecture and requirement description module 325 may be configured to receive and process the architecture description for the software application and the requirement description for the software application. In some embodiments of the inventive subject matter, the architecture and requirement description module 325 may provide a user interface by which a user may input the architecture description and requirement description. The architecture description identifies the one or more generic services that are used in or support a software application. The requirement description may define a plurality of priority parameters, such as an accountability parameter, an agility parameter, an assurance parameter, a financial performance parameter, a security parameter, a privacy parameter, and a usability parameter. A user interface may be provided with a slider or track bar for each parameter allowing the user to select an absolute value for each parameter or a set of values that specify the importance of one parameter relative to other parameter(s).

The interoperability graph generation module 330 may generate an interoperability graph that is used to generate the proposal for the various specific cloud services and service providers. The incompability graph may comprise vertices that represent candidate services and service providers for the multiple generic services with edges between the vertices identifying compatibility relationships between the candidate services and service providers. The compatibility relationships may be expressed in terms of structural compatibility information, conditional compatibility information, and migration compatibility information according to some embodiments of the inventive subject matter.

The cloud service proposal module 335 may be configured to generate a proposal that identifies a specific cloud service and service provider for each of the generic services. The cloud service proposal module 335 may access cloud service information 120 and may query the interoperability graph to generate proposals for the specific services and one or more cloud service providers based on the requirement description, including the priority parameters, and the interoperability graph according to some embodiments of the inventive subject matter. The proposal(s) may be presented to the user.

The risk and quality management module 340 may be configured to provide additional information to the user to accompany the specific cloud service and cloud service provider proposals to allow the user to better evaluate the tradeoffs between various selections of specific cloud services and cloud service providers. For example, the user may be presented with information that because the user placed greater emphasis on cost relative to availability that the proposed specific cloud service(s) and cloud service provider(s) may not guarantee low levels of downtime. If the user placed greater emphasis on performance relative to cost, then the user may be informed that the proposed specific cloud service(s) and cloud service provider(s) provide relatively high throughput, memory, processing speed, or the like, but have above average monthly expenses. In another example, the user may be interested in choosing specific cloud services that allow migration to similar services provided by an alternative cloud service provider. The user may be informed that the migration from the proposed specific cloud service(s) to another similar cloud service(s) and cloud service provider(s) may imply a significant amount of programming effort, time, and/or cost.

Although FIG. 3 illustrates hardware/software architectures that may be used in data processing systems, such as the MultiCloud DSS server 105 of FIG. 1 and the data processing system 200 of FIG. 2, respectively, for generating a proposal for selection of specific services from one or more cloud service providers, according to some embodiments of the inventive subject matter, it will be understood that the present invention is not limited to such a configuration but is intended to encompass any configuration capable of carrying out operations described herein. Moreover, the functionality of the MultiCloud DSS server 105 of FIG. 1 and the data processing system 200 of FIG. 2, and/or the hardware/software architecture of FIG. 3 may be implemented as a single processor system, a multi-processor system, a multi-core processor system, or even a network of stand-alone computer systems, in accordance with various embodiments.

Computer program code for carrying out operations of data processing systems discussed above with respect to FIG. 4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 4:
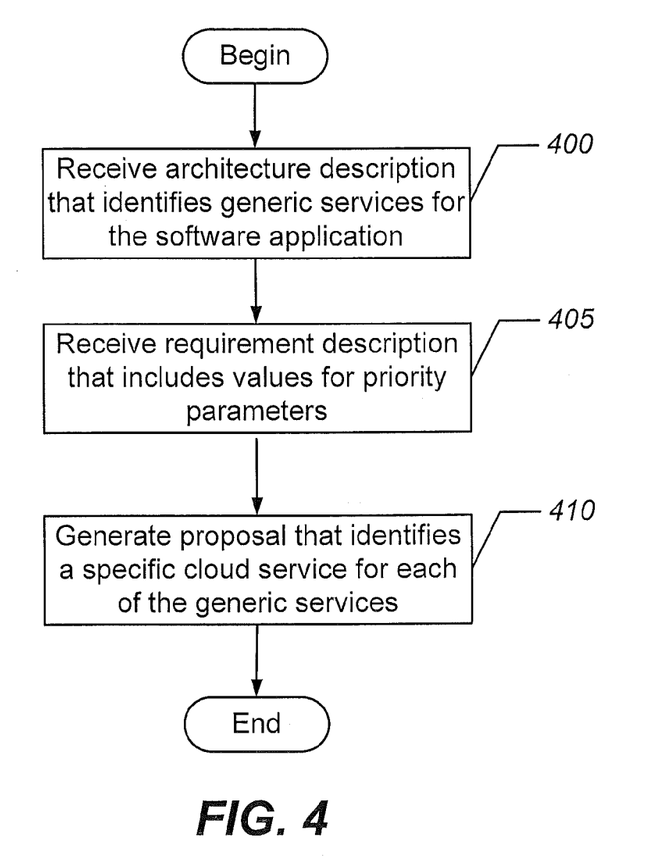
FIG. 4 is a flowchart that illustrates operations for selection of specific services from cloud service providers in accordance with some embodiments of the inventive subject matter.

FIG. 4 is a flowchart that illustrates operations for generating a proposal for selection of specific services from one or more cloud service providers according to some embodiments of the inventive subject matter. Operations begin at block 400 where the DSS MultiCloud DSS server 105 receives the input of an architecture description that identifies one or more generic services that may be used in or to support a software application. The DSS MultiCloud DSS server 105 receives the input of a requirement description at block 405 that comprises values for one or more priority parameters for the software application. These priority parameters may include, but are not limited to, an accountability parameter, an agility parameter, an assurance parameter, a financial performance parameter, a security parameter, a privacy parameter, and a usability parameter. At block 410 the DSS MultiCloud DSS server 105 generates a proposal that identifies a specific cloud service and cloud service provider for each of the generic services. The MultiCloud DSS server 105 may access cloud service information 120 and may query the interoperability graph to obtain compatibility information to generate proposals for the specific cloud service(s) and one or more cloud service providers based on the requirement description, including the priority parameters, and the interoperability graph according to some embodiments of the inventive subject matter. The proposal(s) may be presented to the user. For example, the architecture description may identify three generic services A, B, and C. The cloud service proposal module 335 may generate a proposal of that includes multiple combinations of specific cloud services based on candidate services from the cloud service information 120 and interoperability graph. The proposal of n groups of specific cloud services may be expressed as (A1, B1, C1), (A2, B2, C2) . . . (An, Bn, Cn). The user may select one of the groups, e.g., (A2, B2, C2) as a recommended specific set of cloud services and the risk and quality management module 340 may provide risk and cost information that is associated with the selected group of services. In other embodiments, the cloud service proposal module 335 may generate a proposal that includes a list of specific cloud services based on candidate services from the cloud service information 120 and interoperability graph for each of the generic services. For example, using the previous example in which the architecture description identifies three generic services A, B, and C. The cloud service proposal module 335 may generate a proposal of specific cloud services (A1, A2, . . . An), (B1, B2, . . . Bn), and (C1, C2, . . . Cn). The user can select one of the specific services, such as, for example, B2. The cloud service proposal module 335 may then generate various combinations of specific services to combine with B2, e.g., (A2, B2, C1), (A1, B2, C2), . . . (A1, B2, C1). The user may select one of the groups, e.g., (A2, B2, C1) as a recommended specific set of cloud services and the risk and quality management module 340 may provide risk and cost information that is associated with the selected group of services.

Figure 5:
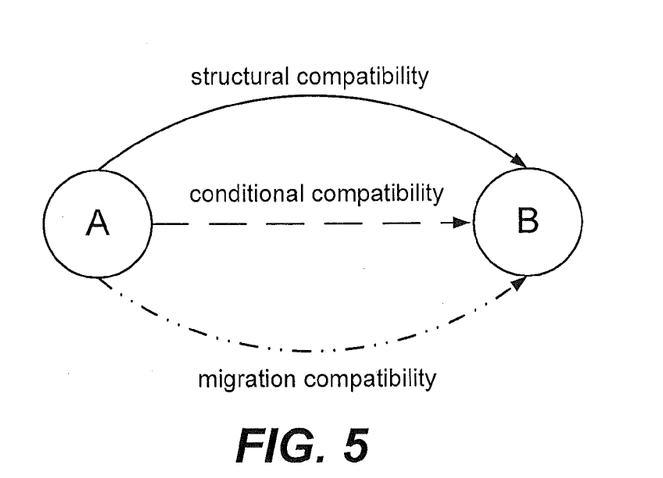
FIGS. 5 and 6 are diagrams of interoperability graphs that illustrate relationships between services to facilitate comparative evaluation in accordance with some embodiments of the inventive subject matter.

As shown in FIG. 5, the compatibility relationships in an interoperability graph may be expressed in terms of structural compatibility information, conditional compatibility information, and migration compatibility information according to some embodiments of the inventive subject matter. Structural compatibility information may include information on whether the infrastructure between services provided by the same or different service providers is compatible, i.e., can work together. Conditional compatibility information may include information related to requirement description for the software application, such as the priority parameters. Thus, the conditional compatibility between services provided by service providers may include, but is not limited to, a representation of factors, such as cost, performance, availability, and security. Migration compatibility information may include information on the degree of ease or difficulty in transitioning from one service and/or service provider to another service and/or service provider. The compatibility relationships in the interoperability graph are shown as edges between the vertices, which correspond to candidate service providers. Compatibility information may be expressed in mathematical form or other suitable scoring nomenclature for processing by the MultiCloud DSS server 105. It will be understood that expressing compatibility between services based on structural, conditional, and/or migration compatibility are examples for purposes of illustrating embodiments of the inventive subject matter. It will be understood that other mechanisms may be used to express compatibility between services in accordance with further embodiments of the inventive subject matter.

Figure 6:
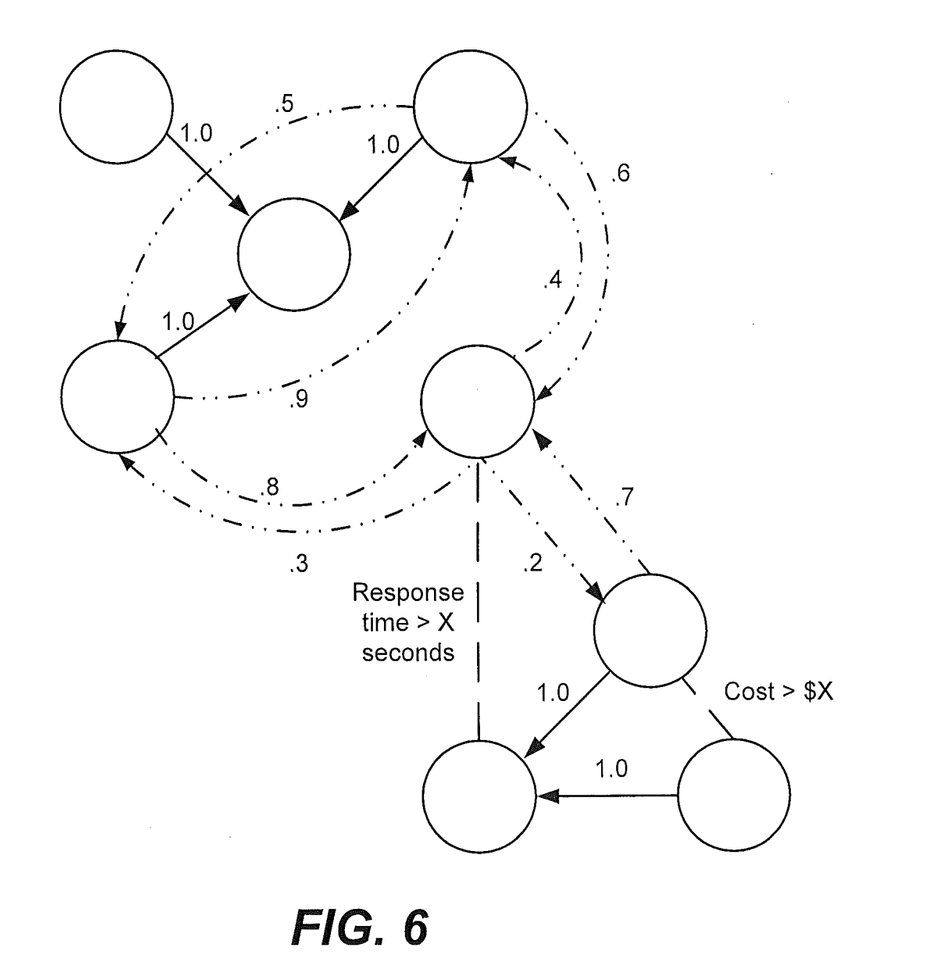

FIG. 6 illustrates an interoperability graph with the vertices representing particular services provided by a particular service provider and the edges representing the structural, conditional, and/or compatibility information between these various services and/or service providers according to some embodiments of the inventive subject matter. The compatibility information is represented by solid, dashed, and dashed/dotted edges corresponding to structural, conditional, and migration compatibility information, respectively. The MultiCloud DSS server 105 may use graph community search algorithms to find a subset of services to fulfill the architecture description of the software application and that achieve a sufficient level of compatibility while attempting to comply with the requirement description for the software application, i.e., satisfy the priority parameters. Finding a better or best configuration of services that fulfill these restrictions may be computed as an iterative search of minimum weight spanning trees on subgraphs of the interoperability graph. Risk and quality information may be determined from the interoperability graph based on a combination of N cloud services where N may be at least two or more and reported through the risk and quality management module 340 based on vertex attributes and/or edge attributes.

The embodiments of methods, systems, and computer program products described herein may assist software application designers, administrators, and the like to choose an improved deployment strategy of a software application in a multicloud environment. Selection of specific services from one or more cloud service providers to implement generic cloud services can be based on various priority parameters related to risk, quality, and cost. A graph based methodology can be used to facilitate defining and analyzing these parameters along with the interactions between services to aid in the selection of a set of specific services provided by one or more service providers according to an initial set of requirements expressed by the software application designer.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
    performing operations as follows on a processor:
    receiving an architecture description for a software application that identifies a plurality of generic services;
    receiving a requirement description for the software application that comprises respective values for a plurality of priority parameters for the software application;
    generating an interoperability graph that comprises vertices representing candidate services for the plurality of generic services; and
    generating a proposal that, for each of the plurality of generic services, identifies a specific cloud service for the respective generic service based on the requirement description and the interoperability graph;
    wherein generating the interoperability graph comprises:
    identifying structural compatibility information between the vertices of the interoperability graph by connecting at least a portion of the vertices with structural compatibility edges, respectively;
    identifying conditional compatibility information between the vertices of the interoperability graph by connecting at least the second portion of the vertices with conditional compatibility edge, respectively; and
    identifying migration compatibility information between the vertices of the interoperability graph by connecting at least the third portion of the vertices with migration compatibility edges respectively.

2. The method of claim 1, wherein the plurality of priority parameters comprises an accountability parameter, an agility parameter, an assurance parameter, a financial performance parameter, a security parameter, a privacy parameter, and a usability parameter.

3. The method of claim 1, wherein the interoperability graph comprises a plurality of the vertices representing a plurality of the candidate services for one of the plurality of generic services.

4. The method of claim 1,
    wherein generating the proposal comprises:
    querying the interoperability graph to obtain structural compatibility information for the candidate services.

5. The method of claim 1,
    wherein generating the proposal comprises:
    querying the interoperability graph to obtain conditional compatibility information for the candidate services.

6. The method of claim 1,
    wherein generating the proposal comprises:
    querying the interoperability graph to obtain structural migration information for the candidate services.

7. The method of claim 1, wherein generating the proposal that identifies the specific cloud services comprises:
    generating a plurality of combinations of specific cloud services from the candidate services;
    wherein the method further comprises:
    receiving a selection of one of the plurality of combinations of specific cloud services by a user; and
    providing risk and cost information to the user that is associated with the one of the plurality of combinations of specific cloud services that was selected by the user.

8. The method of claim 1, wherein generating the proposal that identifies the specific cloud services, comprises:
    receiving a selection of one of the specific cloud services from a user; and
    generating a plurality of combinations of specific cloud services from the candidate services such as that each of the plurality of combinations of specific cloud services includes the one of the specific cloud services that was selected by the user;
    wherein the method further comprises:
    receiving a selection of one of the plurality of combinations of specific cloud services by a user; and
    providing risk and cost information to the user that is associated with the one of the plurality of combinations of specific cloud services that was selected by the user.

9. A system, comprising:
    a processor; and
    a memory coupled to the processor and comprising computer readable program code embodied in the memory that when executed by the processor causes the processor to perform operations comprising:
    receiving an architecture description for a software application hat identifies a plurality of generic services;
    receiving a requirement description for the software application that comprises respective values for a plurality of priority parameters for the software application;
    generating an interoperability graph that comprises vertices representing candidate services for the plurality of generic services; and
    generating a proposal that, for each of the plurality of generic services, identifies a specific cloud service for the respective generic service based on the requirement description and the interoperability graph;
    wherein generating the interoperability graph comprises:
    identifying structural compatibility information between the vertices of the interoperability graph by connecting at least a portion of the vertices with structural compatibility edges, respectively;
    identifying structural compatibility information between the vertices of the interoperability graph by connecting at least a portion of the vertices with conditional compatibility edges, respectively; and
    identifying migration compatibility information between the vertices of the interoperability graph by connecting at least the third portion of the vertices with migration compatibility edges, respectively.

10. The system of claim 9, wherein the plurality of priority parameters comprises an accountability parameter, an agility parameter, an assurance parameter, a financial performance parameter, a security parameter, a privacy parameter, and a usability parameter.

11. The system of claim 9, wherein the interoperability graph comprises a plurality of the vertices representing a plurality of the candidate services for one of the plurality of generic services.

12. The system of claim 9,
wherein generating the proposal comprises:
querying the interoperability graph to obtain structural compatibility information for the candidate services.

13. The system of claim 9,
wherein generating the proposal comprises:
querying the interoperability graph to obtain conditional compatibility information for the candidate services.

14. The system of claim 9,
wherein generating the proposal comprises:
querying the interoperability graph to obtain structural migration information for the candidate services.

15. The system of claim 9, wherein generating the proposal that identifies the specific cloud services comprises:
generating a plurality of combinations of specific cloud services from the candidate services; and
wherein he operations further comprise:
receiving a selection of one of the plurality of combinations of specific cloud services by a user; and
providing risk and cost information to the user that is associated with the one of the plurality of combinations of specific cloud services that was selected by the user.

16. The system of claim 9, wherein generating the proposal that identifies the specific cloud services, comprises:
receiving a selection of one of the specific cloud services from a user;
generating a plurality of combinations of specific cloud services from the candidate services such as that each of the plurality of combinations of specific cloud services includes the one of the specific cloud services that was selected by the user;
wherein the operations further comprise:
receiving a selection of one of the plurality of combinations of specific cloud services by a user; and
providing risk and cost information to the user that is associated with the one of the plurality of combinations of specific cloud services that was selected by the user.

17. A computer program product, comprising:
a tangible computer readable storage medium comprising computer readable program code embodied in the medium that when executed by a processor causes the processor to perform operations comprising:
receiving an architecture description for a software application that identifies a plurality of generic services;
receiving a requirement description for the software application that comprises respective values for a plurality of priority parameters for the software application;
generating an interoperability graph that comprises vertices representing candidate services for the plurality of generic services; and
generating a proposal that, for each of the plurality of generic services, identifies a specific cloud service for the respective generic service based on the requirement description and the interoperability graph;
wherein generating the interoperability graph comprises:
identifying structural compatibility information between the vertices of the interoperability graph by connecting at least a portion of the vertices with structural compatibility edges, respectively;
identifying conditional compatibility information between the vertices of the interoperability graph by connecting at least the second portion of the vertices with conditional compatibility edges, respectively; and
identifying migration compatibility information between the vertices of the interoperability graph by connecting at least third portion of the vertices with migration compatibility edges respectively.

18. The system of claim 17, wherein the plurality of priority parameters comprises an accountability parameter, an agility parameter, an assurance parameter, a financial performance parameter, a security parameter, a privacy parameter, and a usability parameter.

19. The system of claim 17, wherein the interoperability graph comprises a plurality of the vertices representing a plurality of the candidate services for one of the plurality of generic services.

20. The system of claim 17,
wherein generating the proposal comprises:
querying the interoperability graph to obtain structural compatibility information for the candidate services.

21. The system of claim 17,
wherein generating the proposal comprises:
querying the interoperability graph to obtain conditional compatibility information for the candidate services.

22. The system of claim 17,
wherein generating the proposal comprises:
querying the interoperability graph to obtain structural migration information for the candidate services.

23. The system of claim 17, wherein generating the proposal that identifies the specific cloud services comprises:
generating a plurality of combinations of specific cloud services from the candidate services; and
wherein the operations further comprise:
receiving a selection of one of the plurality of combinations of specific cloud services by a user; and
providing risk and cost information to the user that is associated with the one of the plurality of combinations of specific cloud services that was selected by the user.

24. The system of Claim 17, wherein generating the proposal that identifies the specific cloud services, comprises:
receiving a selection of one of the specific cloud services from a user;
generating a plurality of combinations of specific cloud services from the candidate services such as that each of the plurality of combinations of specific cloud services includes the one of the specific cloud services that was selected by the user;
wherein the operations further comprise:
receiving a selection of one of the plurality of combinations of specific cloud services by a user; and
providing risk and cost information to the user that is associated with the one of the plurality of combinations of specific cloud services that was selected by the user.

* * * * *